United States Patent [19]
Lyons

[11] Patent Number: 5,518,254
[45] Date of Patent: May 21, 1996

[54] AID FOR LEARNING TO JUGGLE

[76] Inventor: Randall Lyons, 419 W. Union St., West Chester, Pa. 19382

[21] Appl. No.: 317,922

[22] Filed: Oct. 4, 1994

[51] Int. Cl.$^6$ .................................................. A63B 67/08
[52] U.S. Cl. .......................... 273/441; 273/447; 434/247
[58] Field of Search ............................... 273/108, 118 R, 273/252, 440, 441, 447, 285; 434/247, 248, 258

[56] References Cited

U.S. PATENT DOCUMENTS 3,967,824  7/1976  Lund ....................................... 273/441
5,280,913  1/1994  Sirk ......................................... 273/285

*Primary Examiner*—Ren Yan
*Assistant Examiner*—Steven S. Kelley

[57] ABSTRACT

An inclined, flat, surfaced ramp to simplify and accelerate learning to juggle. One or more balls are rolled up and down the ramp rather than tossed freely in the air. Rolling makes the balls move more slowly and gives the user more control over their trajectory. The angle of the ramp is increased as the user's skill level improves, causing the balls to roll faster, until free-fall speed is achieved and the training aid is no longer needed. Inscribed or printed patterns on the Base Board [1] or Rolling Surface [2] show a recommended pattern for the ball's trajectory. Ramp may have Retaining Ledges [4] at top and/or bottom to keep balls from rolling off the ends of the board. Base Board may be fabricated in sections and optionally hinged in the middle to allow it to fold for easier carrying and storage.

11 Claims, 5 Drawing Sheets

AID FOR LEARNING TO JUGGLE

BACKGROUND—FIELD OF INVENTION

This invention is a training aid which will shorten the time and effort required to learn both beginning and advanced juggling skills.

BACKGROUND—PRIOR ART

Earlier aids to assist in learning juggling consist of books, magazine articles, and videotapes. These aids either describe how to juggle or show how juggling is done, but do not directly support the active participation of the student. Since much of learning to juggle is a process of developing the muscle memory of the participant, these "passive" learning aids are necessarily of a limited value.

The training aid described herein provides the user with "hands-on" experience with juggling balls from the beginning of and throughout the learning process, thus developing the requisite muscle memory. The adjustability of the training aid as described below further enhances its value to the user.

OBJECTS AND ADVANTAGES

Accordingly, several objects and advantages of my invention are:

(a) to provide a participating (rather than passive) training aid for the user which slows the speed of the juggling balls being manipulated to enhance the learning process.

(b) to provide speed adjustability, allowing the user to increase or decrease the velocity of the balls being manipulated. This allows the user to advance his or her juggling skills at his or her own pace.

(c) to provide a two-dimensional juggling surface for learning to juggle. This limits the trajectory of the manipulated juggling balls when compared to the three-dimensional space of normal juggling. The imposed limitation allows the user to focus attention more completely on the learning process rather than worrying about erratic tosses.

(d) to provide an inscribed pattern on a juggling surface which clearly shows the user the correct path the balls should follow.

(e) to provide more practice time spent in active juggling and less time chasing after erratically tossed balls.

Further objects and advantages of my invention will become apparent from a consideration of the drawings and ensuing description.

DESCRIPTION OF INVENTION

Figure 1:
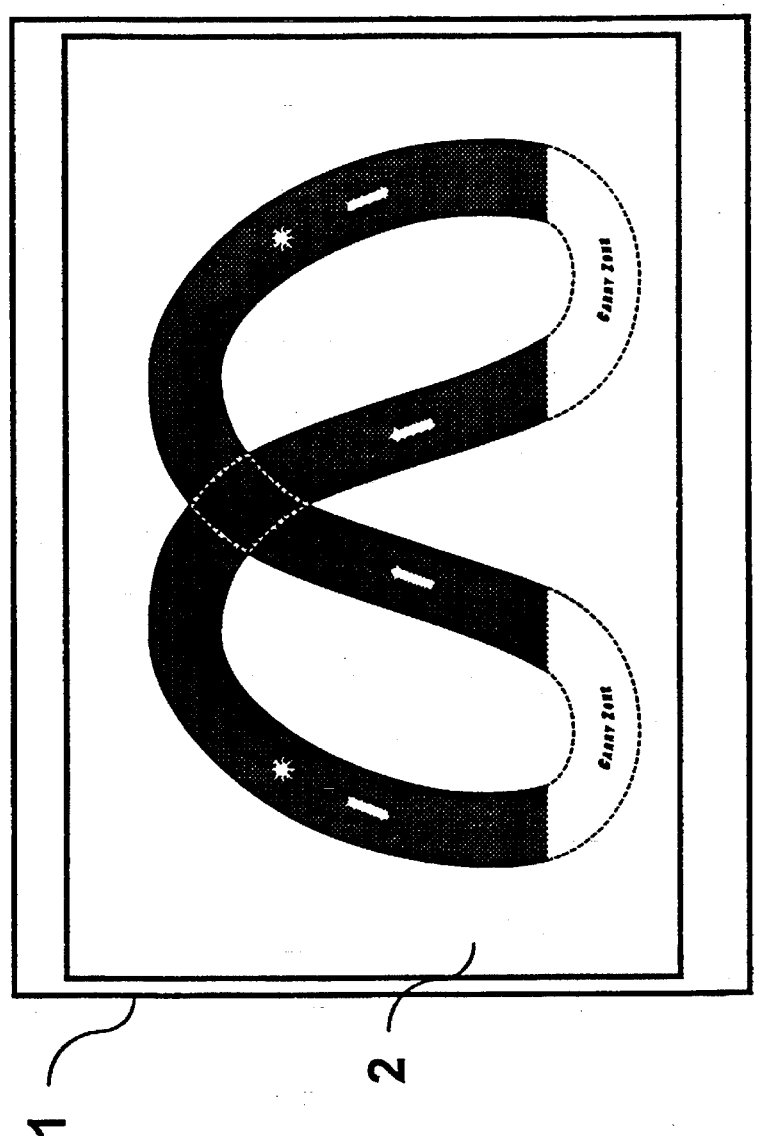
FIG. 1 shows a plan view of one embodiment of the training aid.

The training aid as shown in FIG. 1 consists of a Base Board [1], made of plywood or other firm, flat, sturdy material, which may be a composite panel. Dimensions for the Base Board are roughly 120 cm wide by 78 cm high (46 inches wide by 30 inches high). An optional Rolling Surface [2] made of felt, terrycloth, carpeting, or other heavy cloth is placed on top of the Base Board as shown.

Figure 2:
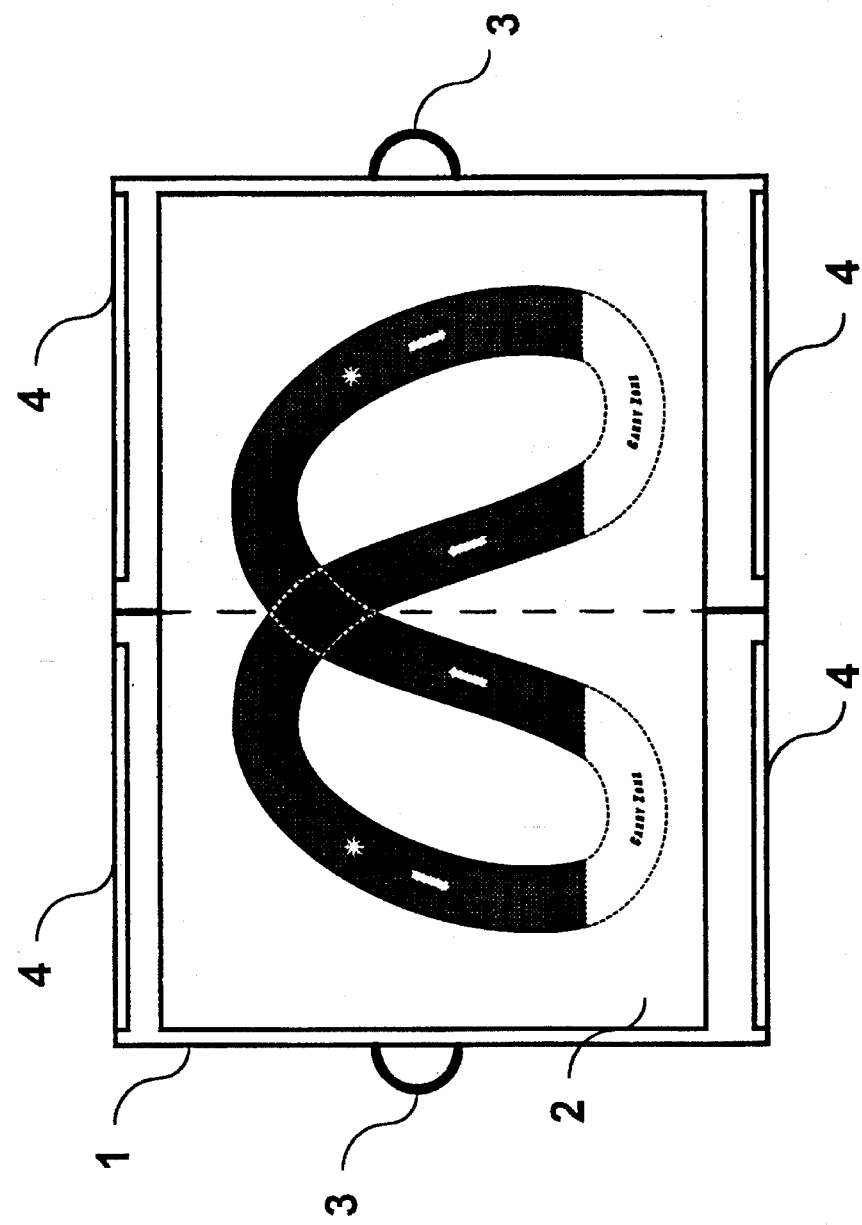
FIG. 2 shows an enhanced version of the training aid, including features as described below.

As shown in FIG. 2, the Base Board may be made in sections and optionally hinged vertically in the middle, so that it can be folded in half for easier carrying and storage. A pair of Handles [3] may also be installed on the left and right edges of the Base Board to make carrying when folded even easier.

The Rolling Surface [2] accomplishes several objectives. First, by presenting more friction to the rolling ball than a bare hard surface would present, the Rolling Surface slows the ball's trajectory, which gives the user more time to learn the juggling pattern and recover from erratically rolled balls. Second, the Rolling Surface helps to quiet whatever noise may be generated by the bails thumping against or rolling across the training aid. Third, juggling patterns or vertical and horizontal guide lines may be inscribed or printed on the Rolling Surface (or directly on the Base Board) to guide the user in achieving the correct ball trajectory. If these patterns are printed on the Rolling Surface, then multiple patterns may be created and used for learning different juggling patterns by using both sides of the Rolling Surface or multiple Rolling Surfaces.

Figure 3:
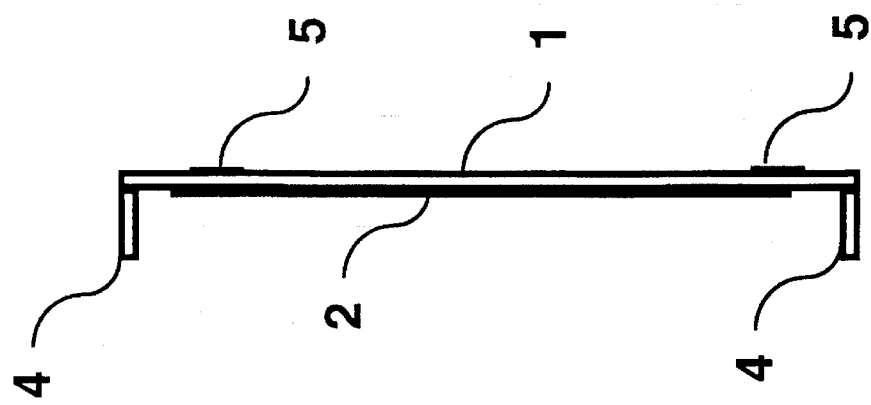
FIG. 3 shows an edge-on view of the training aid.

One or more Retaining Ledges [4] may be mounted on the top and/or bottom of the Base Board as shown as shown in FIG. 3. These Retaining Ledges can be roughly 7 cm tall by 2 cm thick, but other embodiments of Retaining Ledges are available.

The optional Hinges [5] are shown in FIG. 3. A piano hinge may be preferred for this application for appearance sake, but other hinge styles will be equally effective.

Figure 4:
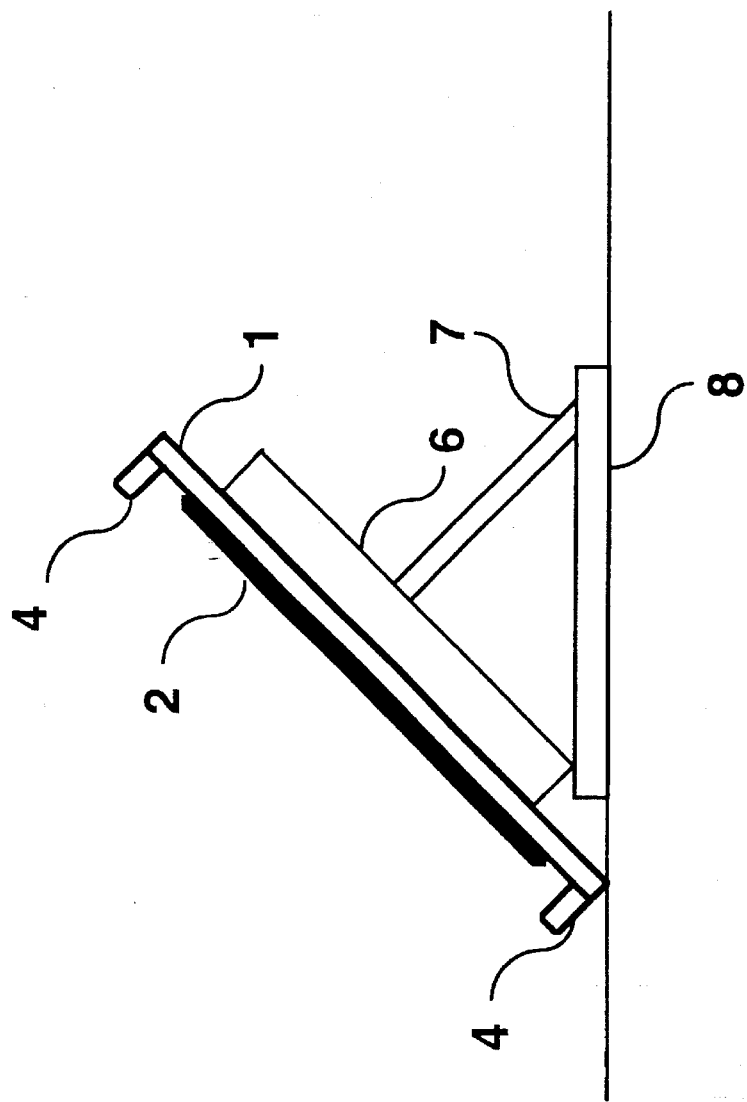
FIG. 4 shows the training aid positioned at an angle at which it may be employed, with an optional Tilt-Adjusting Frame [6] in place for supporting the training aid.
Figure 5:
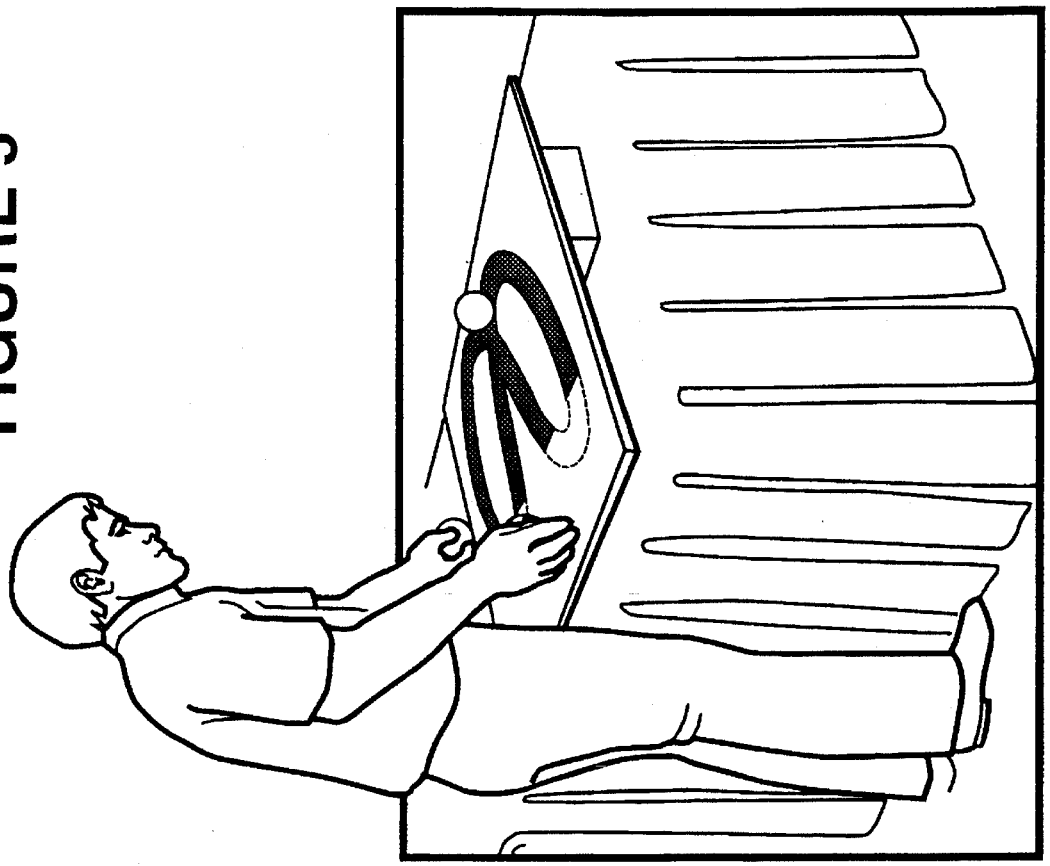
FIG. 5 shows a person actively engaged in using the training aid.

An optional Tilt-Adjusting Frame [6] to hold the training aid at an optimal angle is shown in FIG. 4. This Tilt-Adjusting Frame can be made in a wide variety of styles and from a wide variety of materials. The only requirement is that the Tilt-Adjusting Frame be large enough and strong enough to support the Base Board and that it be adjustable from horizontal to a slope of approximately 45 degrees. Also shown in FIG. 4 are a Support Rod [7] and Support Base [8] which provide stability and adjustability to the Tilt-Adjusting Frame.

OPERATION OF INVENTION

The user of this invention will place the Base Board [1], laid open as shown in the drawings, on a horizontal surface at approximately hip height to waist height. A bed or low table may be used for this purpose, but many other surfaces will prove equally useful. The top edge (i.e., the one farthest from the user) should be raised so that the surface rests at approximately a 10-degree or 15-degree angle for beginners work. More advanced users will employ a steeper angle. Support for this angle may be accomplished with any convenient stacking material, such as pillows or books. An optional Tilt-Adjusting Frame [6] shown in FIG. 4 may also be employed to support the Base Board.

To begin, the user stands close to the lower edge of the Base Board [1], holding one or more balls of a size and weight appropriate for juggling. Rather than tossing the balls freely into the air as with normal juggling, the user rolls the balls up the inclined surface of the Base Board. The balls then roll back down to the user's waiting hand. The trajectory of the ball thus rolled will closely resemble that of a ball tossed freely in the air. The speed of the ball, however, will be much slower. Therefore, the time it takes the ball to roll up and back down the inclined surface will be much longer than for a conventional juggling toss. One or more balls can thus be rolled in a pattern across the inclined surface in a slow, deliberate fashion. This practice allows the user considerably more time to learn a desired pattern of tosses and catches when compared to normal juggling.

Patterns printed on the optional Rolling Surface [2] or the Base Board [1] will further enhance the learning process. The optional Retaining Ledges [4] will stop any balls from rolling off the top or the bottom of the board. In this way, the user becomes comfortable with and proficient at juggling in a given pattern with the Base Board [1] at a mild angle. He or she may then increase the angle of the Base Board, causing the balls to move more quickly up and back down the ramped surface. The user must then increase his or her speed of ball manipulation accordingly-thus increasing his or her skill level and more closely approximate the catching and releasing of balls in normal juggling. Eventually, the user will become skilled enough in rapid ball manipulation that the training aid will no longer be required.

At this point, the user will be able to practice the juggling pattern unassisted. The invention may still be used, however, to reinforce the user's existing skills or master different and more difficult juggling patterns.

CONCLUSION, RAMIFICATIONS, AND SCOPE OF INVENTION

Thus the reader will see that the juggling training device described above is an adjustable, easy-to-use aid that will enhance the learning process in several ways:

The speed of the balls being manipulated is adjustable to suit the user's current skill level.

The optional pattern on the invention's top surface guides the user in the recommended size and shape of the ball's trajectory.

The fact that the ball is almost always in contact with the invention's top surface dramatically decreases the number of erratic throws which must be retrieved from behind or under the nearby furniture. This, in turn, allows the student more effective use of practice time to concentrate on learning the juggling skill.

Additional enhancements are possible, such as the provision of multiple Rolling Surfaces [2] to describe a variety of juggling patterns. Also, the Base Board with juggling pattern displayed may be mounted on a wall vertically to remind the user of the pattern being attempted as he or she tosses the juggling balls freely in the air.

Accordingly, the scope of the invention should be determined not by the embodiment(s) illustrated, but by the appended claims and their legal equivalents.

I claim:

1. A learning aid for juggling comprising a plain, flat support ramp with a rolling surface on which balls are rolled by a user, wherein a juggling pattern is printed on said rolling surface, a means to support said support ramp at an angle inclined to the horizontal, and means to adjust the angle of said support ramp.

2. The learning aid of claim 1 wherein the rolling surface comprises felt.

3. The learning aid of claim 1 wherein the rolling surface comprises canvas.

4. The learning aid of claim 1 wherein the rolling surface comprises a plastic laminate.

5. The learning aid of claim 1 wherein the rolling surface comprises a heavy fabric material.

6. The learning aid of claim 1 further including a two-piece construction of the base board.

7. The learning aid of claim 6 further including a hinge means in the center of the base board.

8. The learning aid of claim 1 further including ridges at the edges of the board.

9. The learning aid of claim 1 further including an adjustable support structure wherein the means to adjust the angle includes a support rod and a support base.

10. A kit of equipment for learning to juggle wherein comprised of the learning aid of claim 1 and a set of juggling balls to support the learning activity.

11. A method of learning to juggle comprising the steps of:

a. rolling a ball up the surface of an adjustable-height ramp which has a juggling pattern printed on the said surface b. catching the ball as it rolls back down the ramp and rolling it back up the surface to continue the juggling pattern.

* * * * *